(12) United States Patent
Huang

(10) Patent No.: US 7,321,096 B1
(45) Date of Patent: Jan. 22, 2008

(54) SHELL BODY ASSEMBLY STRUCTURE

(75) Inventor: Yu-Cheng Huang, Hsinchu (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 11/464,554

(22) Filed: Aug. 15, 2006

(51) Int. Cl.
*H01H 9/02* (2006.01)

(52) U.S. Cl. .......................... 174/58; 174/48; 174/135; 361/714; 396/29; 220/4.26

(58) Field of Classification Search ................. 174/58, 174/48, 135; 361/714, 816, 818, 753, 800; 220/4.02, 4.26; 396/6, 29, 25, 27
See application file for complete search history.

(56) References Cited

U.S. PATENT DOCUMENTS 6,359,218 B1 * 3/2002 Koch et al. .................. 174/50
6,960,720 B2 * 11/2005 Wen-Lung .................. 174/50
7,179,996 B1 * 2/2007 Britt et al. ................... 174/66

* cited by examiner

*Primary Examiner*—Dhiru R. Patel
(74) *Attorney, Agent, or Firm*—Ming Chow; Sinorica, LLC

(57) ABSTRACT

A shell body assembly structure includes a first shell body, a second shell body and a frame. A plurality of fixing portions is projectively disposed at the peripheral edge of the first shell body. A locking point is formed on each of the fixing portions. The second shell body has a plurality of holes corresponding to the locking points to lock the locking points so that the first shell body and the second shell body can be locked together. A plurality of openings corresponding to the fixing portions is disposed at the peripheral edge of the frame. A locking hook is formed on each of the opening. When the locking point is pressed down, the fixing portion can be pushed away and then locked with the locking hook, thereby separating the first shell body and the second shell body.

3 Claims, 4 Drawing Sheets

SHELL BODY ASSEMBLY STRUCTURE

BACKGROUND OF THE INVENTION

1. Field of the Invention

The present invention relates to a shell body assembly structure and, more particularly, to a shell body assembly structure applicable to photographing devices.

2. Description of Related Art

The exterior assembly of existent photographing devices such as camcorders or cameras is accomplished by means of screw to assemble and fix the shell body. As shown in FIG. 1, a conventional camera comprises a first shell body 2 and a second shell body 4. The side faces of the first shell body 2 and the second shell body 4 are fixed with screws 6 and 8. More screws are required for fixing other surfaces of the camera to make the structure of the shell body of the camera firmer.

This assembly way, however, requires many screws 6 and 8, and it is also necessary to form many corresponding screw holes on the first shell body 2 and the second shell body 4. Therefore, the whole manufacturing cost will increase, and the assembly and disassembly of the structure will be very inconvenient and waste much time.

Accordingly, the present invention aims to propose a shell body assembly structure of more perfect design that can be conveniently assembled and disassembled to avoid the use of screw, thereby lowering the manufacturing cost.

SUMMARY OF THE INVENTION

An object of the present invention is to provide a shell body assembly structure, which makes use of corresponding structures of locking points and holes matched with the design of locking hooks to replace conventional screws so as to facilitate the assembly and disassembly of the shell body. The present invention also simplifies the manufacture to enhance the production efficiency and lower the production cost, hence solving the cost problem of using many screws for assembly of the shell body structure in the prior art.

Another object of the present invention is to provide a shell body assembly structure applicable to photographing devices.

To achieve the above objects, the present invention provides a shell body assembly structure, which comprises a first shell body, a second shell body and a frame. A plurality of fixing portions is projectively disposed at the peripheral edge of the first shell body. A locking point is formed on each of the fixing portions. The second shell body has a plurality of holes corresponding to the locking points of the fixing portions. The frame is sleeved into the second shell body. A plurality of openings corresponding to the fixing portions is disposed at the peripheral edge of the frame. The fixing portions are placed in the openings to lock the locking points in the holes so that the first shell body and the second shell body can be locked together. Moreover, a locking hook is formed on each of the openings of the frame. When the locking point locked in the hole is pressed down, the fixing portion can be pushed away from the opening and then locked with the locking hook so as to avoid spring back of the fixing portion.

When the first shell body and the second shell body are locked together, it is only necessary to press down all the locking points to push all the fixing portions away from the openings and then lock the fixing portions with the locking hooks. The two shell bodies can then be easily separated, hence resulting in much convenience in use.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

The present invention discloses a shell body assembly structure that can be easily assembled and disassembled and can also lower the production cost.

Figure 1:
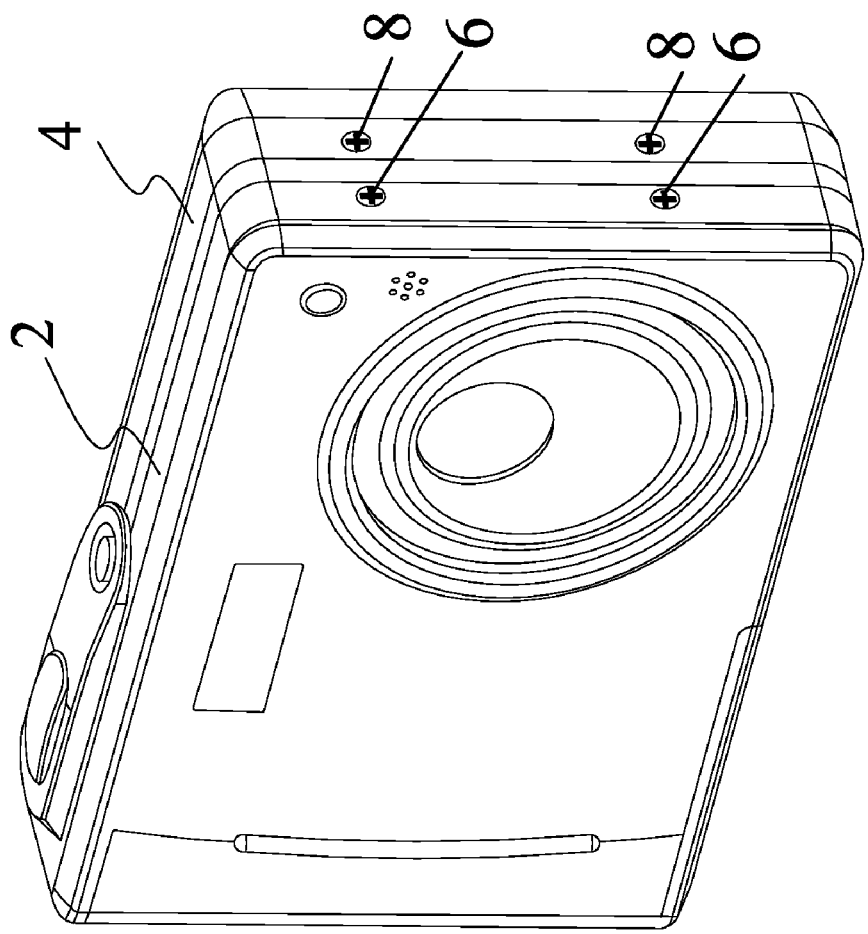
FIG. 1 is a perspective view of a prior art camera.
Figure 2:
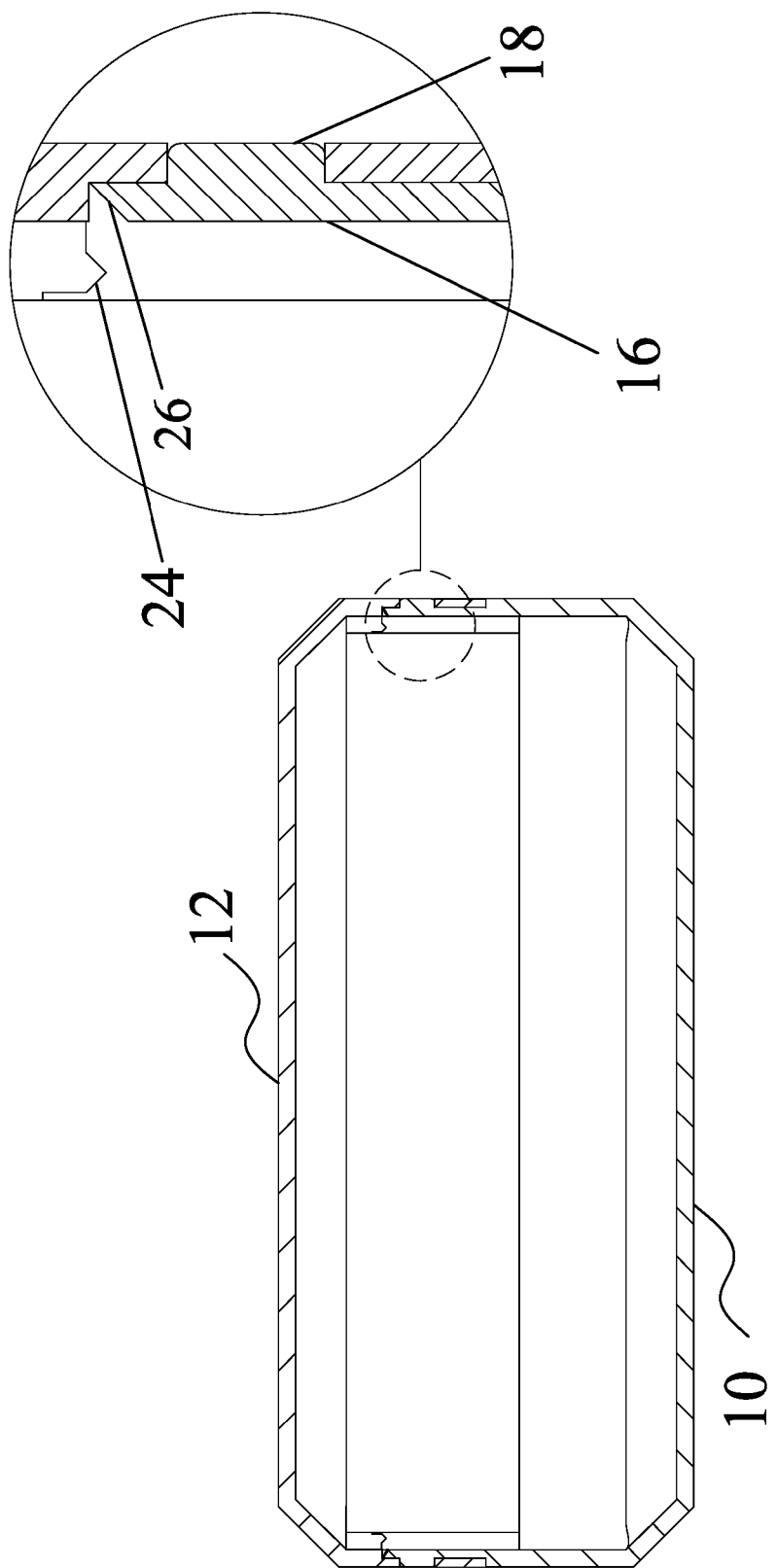
FIG. 2 is a cross-sectional view of the present invention.
Figure 3:
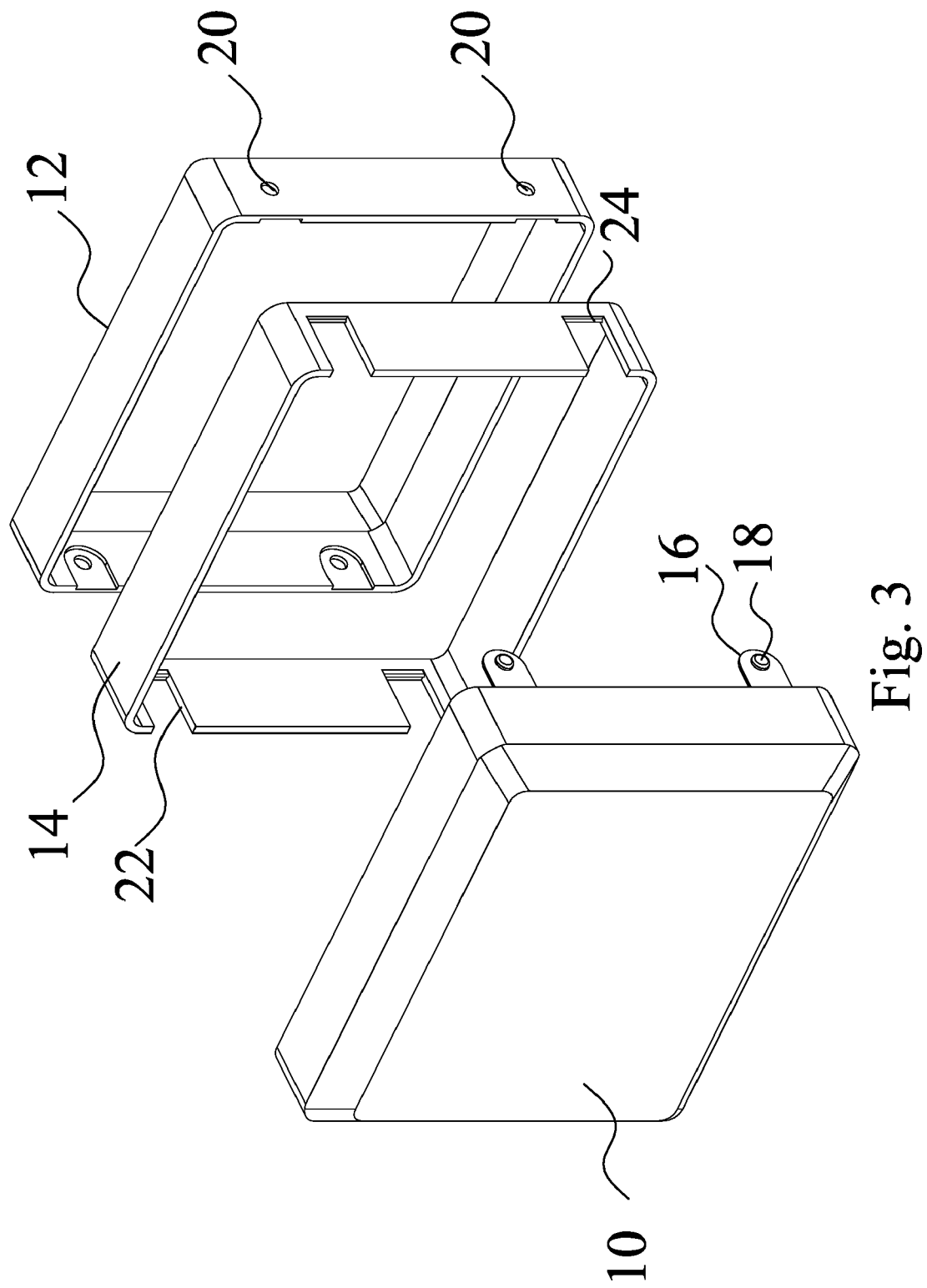
FIG. 3 is an exploded perspective view of the present invention.

As shown in FIGS. 2 and 3, the shell body assembly structure of the present invention comprises a first shell body 10, a second shell body 12 and a frame 14. The frame 14 is sleeved into the second shell body 12. Four fixing portions 16 are projectively disposed at the peripheral edge of the first shell body 10. A projective locking point 18 is formed on each of the fixing portions 16. The second shell body 12 has four holes 20 corresponding to the locking points 18 of the fixing portions 16 so that the locking points 18 can be locked in the fixing portions 20 and protrude out of the second shell body 12. Moreover, four openings 22 corresponding to the fixing portions 16 are disposed at the peripheral edge of the frame 14. A locking hook 24 is formed on each of the openings 22. The fixing portion 16 is placed in the opening 22 to lock the locking point 18 of the fixing portion 16 in the corresponding hole 20 so that the first shell body 10 and the second shell body 12 can be locked together, as shown in FIG. 2. Each of the fixing portions 16 has an inclined plane 26, as shown by the locally enlarged view in FIG. 2.

Figure 4:
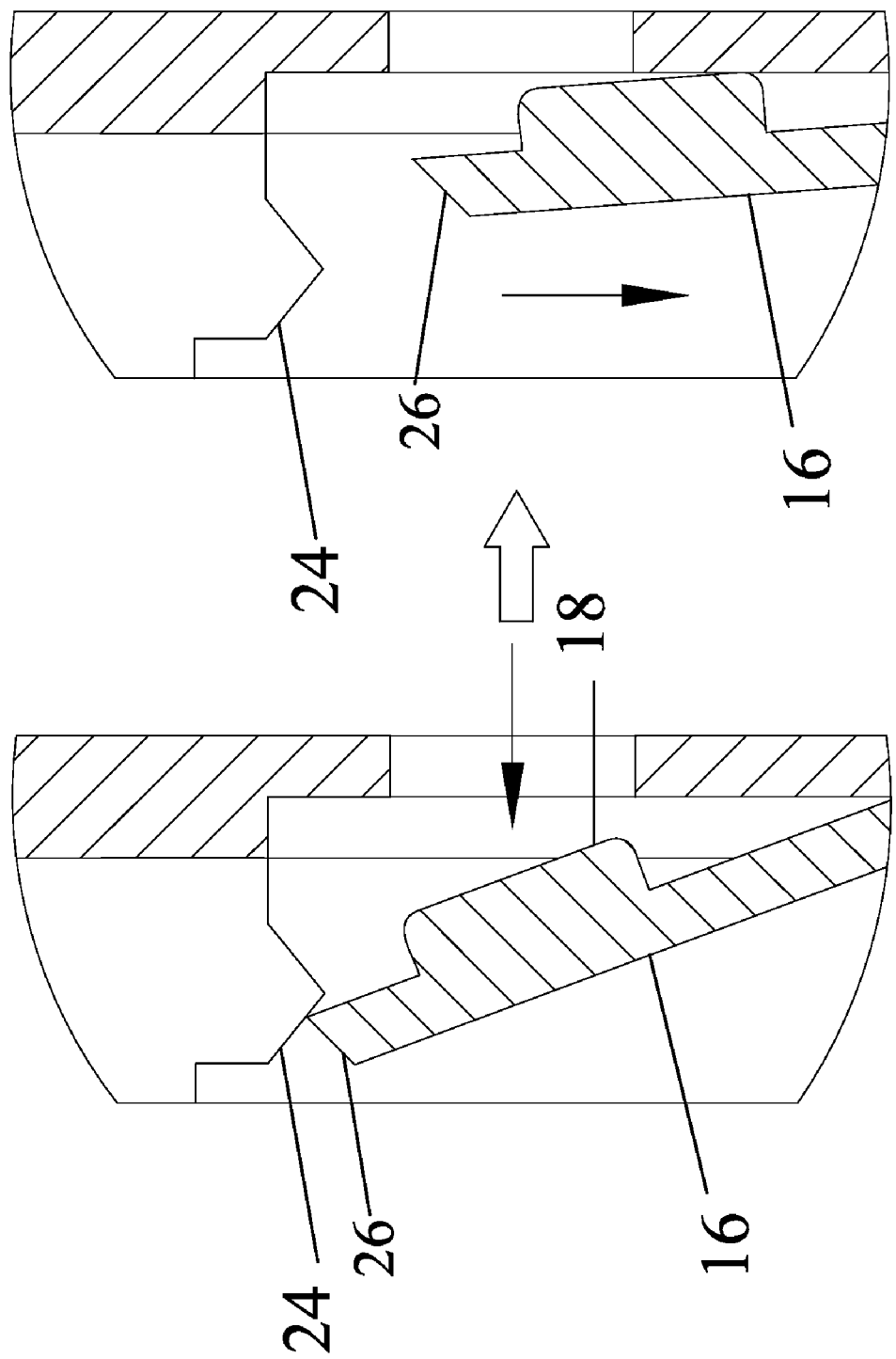
FIG. 4 is a state diagram of the present invention when the shell body is disassembled.

As shown in FIG. 4, because the inclined plane 26 of the fixing portion 16 can contact the locking hook 24, when the locking point 18 locked in the hole 20 is pressed down, the fixing portion 16 can be pushed away from the opening 22 and then locked with the locking hook 24. Therefore, when the first shell body 10 and the second shell body 12 is locked together, it is only necessary to press down all the locking points 18 to push the locking portions 16 away from the openings 22 and then lock the locking portions 16 with the locking hooks 24, thereby separating the first shell body 10 and the second shell body 12.

To sum up, the present invention provides a shell body assembly structure, which makes use of corresponding structures of locking points and holes matched with the design of locking hooks to replace screws so as to facilitate the assembly of the shell body. Besides, in order to facilitate the disassembly of the two shell bodies that are locked together, the locking point locked in the hole is designed to protrude out of the shell bodies. It is only necessary to press down the protruding locking point to push away the fixing portion and lock the fixing portion with the locking hook, hence separating the two shell bodies. Therefore, the shell body assembly structure of the present invention is easier to assemble and disassemble as compared to the convention structure, and solves the cost problem of using many screws for assembly of the shell body structure in the prior art.

Moreover, the present invention applies to photographing devices such as camcorders and cameras to facilitate the assembly and disassembly their shell body structure.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A shell body assembly structure used in a photographing device, said shell body assembly structure comprising:
    a first shell body having a plurality of fixing portions projectively disposed at a peripheral edge thereof, a locking point being formed on each of said fixing portions; and
    a second shell body having a plurality of holes, which are respectively corresponding to said locking point on each of said fixing portions to make said locking point on each of said fixing portions locked inside said holes so that said first shell body and said second shell body can be locked together; and
    a frame wherein said frame is sleeved into said second shell body, a plurality of openings corresponding to said fixing portions are disposed at a peripheral edge of said frame, said fixing points being placed into said openings to lock said locking points of said fixing portions with said holes.

2. The shell body assembly structure as claimed in claim 1, wherein each said opening of said frame further has a locking hook, and said fixing portion is pushed away from said opening and then locked with said locking hook to avoid spring back of said fixing portion when said locking point is pressed down.

3. The shell body assembly structure as claimed in claim 2, wherein said fixing portion further has an inclined plane capable of touching said locking hook so that said fixing portion is pushed away from said opening when said locking point is pressed down.

* * * * *